(12) United States Patent
Maloney

(10) Patent No.: US 6,501,379 B2
(45) Date of Patent: Dec. 31, 2002

(54) OBJECT CARRIERS FOR AN OBJECT CONTROL AND TRACKING SYSTEM

(75) Inventor: William C. Maloney, Marietta, GA (US)

(73) Assignee: Key-Trak, Inc., Duluth, GA (US)

( * ) Notice: Subject to any disclaimer, the term of this patent is extended or adjusted under 35 U.S.C. 154(b) by 114 days.

(21) Appl. No.: 09/792,987

(22) Filed: Feb. 26, 2001

(65) Prior Publication Data

US 2001/0009397 A1 Jul. 26, 2001

Related U.S. Application Data

(63) Continuation of application No. 09/393,225, filed on Sep. 9, 1999, now Pat. No. 6,195,005.
(60) Provisional application No. 60/099,954, filed on Sep. 11, 1998.

(51) Int. Cl.$^7$ .............................................. G08B 13/14
(52) U.S. Cl. ................ 340/568.1; 340/568.7; 340/572.8
(58) Field of Search ............................ 340/551, 568.1, 340/572.1, 572.2, 572.4, 572.7, 572.9, 825.34, 825.49, 10.1; 705/28, 32; 235/375, 383, 385

(56) References Cited

U.S. PATENT DOCUMENTS

| | | |
|---|---|---|
| 527,589 A | 10/1894 | Bristol .................... 312/212 |
| D29,236 S | 8/1898 | Walter ....................... 76/15 |
| 2,859,789 A | 11/1958 | Buckett .................. 206/37.4 |
| 2,971,806 A | 2/1961 | Andreasen ............... 312/223.1 |
| 3,451,043 A | 6/1969 | Krause ..................... 235/385 |
| 3,648,241 A | 3/1972 | Naito et al. ................. 340/5.5 |
| 4,060,795 A | 11/1977 | Harumiya et al. ........... 340/518 |
| 4,112,717 A | 9/1978 | Bradley ....................... 70/63 |
| 4,209,787 A | 6/1980 | Freeny, Jr. ................. 342/457 |
| 4,267,942 A | 5/1981 | Wick, Jr. et al. ............... 221/2 |
| 4,275,385 A | 6/1981 | White .................... 340/825.49 |

(List continued on next page.)

FOREIGN PATENT DOCUMENTS

| | | | |
|---|---|---|---|
| WO | WO9504324 | 2/1993 | |
| WO | WO9512858 | 5/1995 | |
| WO | WO 96/31790 | 10/1996 | .......... G01V/15/00 |
| WO | WO 97/04338 | 2/1997 | .......... G01V/15/00 |
| WO | WO 97/48990 | 12/1997 | ............ G01V/3/08 |
| WO | WO 98/15851 | 4/1998 | ............ G01V/3/10 |
| WO | WO 98/15853 | 4/1998 | .......... G01V/15/00 |
| WO | WO 98/26312 | 6/1998 | .......... G01V/15/00 |
| WO | WO 99/09436 | 2/1999 | .......... G01V/15/00 |
| WO | WO 99/23741 | 5/1999 | .......... G01V/15/00 |
| WO | WO 99/35516 | 7/1999 | .......... G01V/15/00 |

OTHER PUBLICATIONS

Booklet "50 Ways to Touch Memory–Third Edition"; Dallas Semiconductor–Dallas, TX; 1994; pp. 1–92.

*Primary Examiner*—Van Trieu
(74) *Attorney, Agent, or Firm*—Womble Carlyle Sandridge & Rice PLLC

(57) ABSTRACT

Object carriers are provided for use with an object tracking and control system of the type having a storage receptacle with a tray provided with an array of slots for receiving ID tags bearing touch memory devices. A computer-based controller is provided for detecting the absence or presence and identity of ID tags disposed in the slots. The carrier of this invention includes a container with an openable panel for placing objects in and removing objects from the carrier. A thin plastic tongue projects from the carrier and bears a touch memory device. Carriers bearing objects to be tracked are placed in the storage receptacle with their tongues extending into the slots of the receptacle. The controller can thus detect and log the removal and replacement of the carrier in the storage receptacle. In one embodiment, the opening and closing of the carrier when it is not stored in the receptacle is detected and logged for tracking access to the carrier in more detail.

54 Claims, 6 Drawing Sheets

U.S. PATENT DOCUMENTS

| | | | |
|---|---|---|---|
| 4,419,734 A | 12/1983 | Wolfson et al. | 702/109 |
| 4,519,522 A | 5/1985 | McElwee | 221/13 |
| 4,549,170 A | 10/1985 | Serres et al. | 340/568.1 |
| 4,575,719 A | 3/1986 | Bertagana et al. | 340/825.35 |
| 4,595,922 A | 6/1986 | Cobb et al. | 340/825.49 |
| 4,635,053 A | 1/1987 | Banks et al. | 340/825.31 |
| 4,636,950 A | 1/1987 | Caswell et al. | 705/28 |
| 4,658,357 A | 4/1987 | Carroll et al. | 700/32 |
| 4,661,806 A | 4/1987 | Peters et al. | 340/568.1 |
| 4,673,915 A | 6/1987 | Cobb | 340/330 |
| 4,737,910 A | 4/1988 | Kimbrow | 705/28 |
| 4,796,209 A | 1/1989 | Burk | 700/302 |
| 4,799,587 A | 1/1989 | Desanto | 206/37.6 |
| 4,812,985 A | 3/1989 | Hambrick et al. | 700/215 |
| 4,814,592 A | 3/1989 | Bradt et al. | 235/381 |
| 4,827,395 A | 5/1989 | Anders et al. | 700/9 |
| 4,839,875 A | 6/1989 | Kuriyama et al. | 369/14 |
| 4,845,492 A | 7/1989 | Cobb et al. | 340/825.49 |
| 4,853,692 A | 8/1989 | Wolk et al. | 340/573.1 |
| 4,866,661 A | 9/1989 | dePrins | 235/382 |
| 4,889,977 A | 12/1989 | Haydon | 235/375 |
| 4,926,161 A | 5/1990 | Cupp | 340/988 |
| D308,777 S | 6/1990 | Gambello | D6/467 |
| 5,021,778 A | 6/1991 | Walton | 340/10.34 |
| 5,038,023 A | 8/1991 | Saliga | 235/385 |
| 5,062,151 A | 10/1991 | Shipley | 359/154 |
| 5,099,227 A | 3/1992 | Geiszler et al. | 340/572.5 |
| 5,172,829 A | 12/1992 | Dellicker, Jr. | 221/13 |
| 5,182,570 A | 1/1993 | Nysen et al. | 343/795 |
| 5,218,344 A | 6/1993 | Ricketts | 340/573.4 |
| 5,287,414 A | 2/1994 | Foster | 382/100 |
| 5,319,544 A | 6/1994 | Schmerer et al. | 705/28 |
| 5,335,170 A | 8/1994 | Petteruti et al. | 705/28 |
| 5,374,815 A | 12/1994 | Waterhouse et al. | 235/383 |
| 5,402,104 A | 3/1995 | LaRosa | 340/539 |
| 5,404,384 A | 4/1995 | Colburn et al. | 377/6 |
| 5,426,284 A | 6/1995 | Doyle | 705/28 |
| 5,434,775 A | 7/1995 | Sims et al. | 705/8 |
| 5,448,110 A | 9/1995 | Tuttle et al. | 257/723 |
| 5,510,770 A | 4/1996 | Rhoads | 340/572.3 |
| 5,521,815 A | 5/1996 | Rose, Jr. | 705/28 |
| 5,525,969 A | 6/1996 | LaDue | 340/573.6 |
| 5,528,222 A | 6/1996 | Moskowitz et al. | 340/572.7 |
| 5,533,079 A | 7/1996 | Colburn et al. | 377/6 |
| D375,857 S | 11/1996 | De Blois | D6/511 |
| 5,574,470 A | 11/1996 | de Vall | 343/895 |
| 5,612,683 A | 3/1997 | Trempala et al. | 340/5.23 |
| 5,627,520 A | 5/1997 | Grubbs et al. | 340/572.1 |
| 5,661,457 A | 8/1997 | Ghaffari et al. | 340/572.7 |
| D383,341 S | 9/1997 | Grosfillex | D6/511 |
| 5,671,362 A | 9/1997 | Cowe et al. | 340/568.1 |
| 5,689,238 A | 11/1997 | Cannon, Jr. et al. | 340/572.1 |
| 5,703,785 A | 12/1997 | Bluemel et al. | 700/244 |
| 5,708,419 A | 1/1998 | Isaacson et al. | 340/572.5 |
| 5,721,531 A | 2/1998 | Garver et al. | 340/825.49 |
| 5,736,929 A | 4/1998 | Schrott et al. | 340/572.1 |
| 5,739,765 A | 4/1998 | Stanfield et al. | 340/825.49 |
| 5,768,921 A | 6/1998 | Hill | 70/63 |
| 5,777,884 A | 7/1998 | Belka et al. | 700/225 |
| 5,801,628 A | 9/1998 | Maloney | 340/568.2 |
| 5,821,859 A | 10/1998 | Schrott et al. | 340/572.6 |
| 5,934,499 A | 8/1999 | Van der Hoven | 220/475 |
| D415,367 S | 10/1999 | Smith | D6/407 |
| 5,963,134 A | 10/1999 | Bowers et al. | 340/572.1 |
| 6,075,441 A | 6/2000 | Maloney | 340/568.1 |
| D429,093 S | 8/2000 | Miller | D6/467 |
| 6,195,005 B1 * | 2/2001 | Maloney | 340/568.1 |
| 6,204,764 B1 | 3/2001 | Maloney | 340/568.1 |
| 6,232,876 B1 | 5/2001 | Maloney | 340/568.1 |

* cited by examiner

SCHEMATIC FOR A STORAGE BOX

OBJECT CARRIERS FOR AN OBJECT CONTROL AND TRACKING SYSTEM

CROSS-REFERENCE TO RELATED APPLICATION

This application is a continuation of application Ser. No. 09/393,225, filed Sep. 9,1999, now U.S. Pat. No. 6,195,005 B1.

This application claims the benefit of the filing date of prior filed U.S. provisional patent application Ser. No. 60/099,954 filed Sep. 11, 1998 (37 CFR 1.78(a)(4)).

TECHNICAL FIELD

This invention relates generally to object tracking and control systems and more particularly to enhancements usable with such systems for tracking larger or collections of keys and loose objects other than keys.

BACKGROUND OF THE INVENTION

Many objects have intrinsic value or have value because they provide access to other valuable objects. For instance, jewelry and coins have inherent and intrinsic value while keys, such as keys to vehicles, have value because they provide access to other valuable objects, namely automobiles and trucks. Further, access to and control of some items, such as narcotics for example, needs to be monitored, tracked, and controlled to assure against unauthorized access or to assure that proper and appropriate access is catalogued. There is a serious need to be able to track, catalogue access to, and control such objects in a way that is reliable, simple to implement, and virtually tamper proof.

In the past, a variety of systems have been implemented to track and control objects. In the case of keys in an automobile dealership, for example, peg boards have been used to keep track of the keys as salespersons, maintenance personnel, and others remove keys for access to vehicles. Generally, sign-out sheets have been used to log the check-in and check-out of such keys. Obviously, such a manual system of tracking has numerous shortcomings due in large part to the very real potential of human error and forgetfulness in carrying out the sign-in and sign-out procedures. More recently, automated computer controlled key tracking systems have been implemented for tracking, for example, vehicle keys at car lots and keys to the apartments of apartment complexes. One such system particularly applicable to the present invention is the key tracking system disclosed and claimed in my U.S. Pat. No. 5,801,628 and my pending U.S. patent application Ser. No. 09/073,757, the disclosures of which are hereby incorporated fully by reference. In this system, referred to herein as the "Key Track" system, keys to a vehicle are attached with a rivet or the like to a thin plastic key tag having a depending tongue. The tongue carries a small button-shaped electronic touch memory device, which stores a ID code. The tongues of the key tags are configured to be insertable in an array of slots formed in a panel within a storage drawer. A printed circuit back plane is disposed beneath the array of slots and is provided with a plurality of pairs of metal contacts, each pair of contacts being aligned with a corresponding one of the slots. When the tongue of a key tag is inserted in a selected one of the slots, its touch memory device is engaged by the corresponding pair of contacts.

A computer based controller is electronically coupled through a data matrix to the contacts on the back plane and periodically polls each pair of contacts, preferably several times per second, to determine the presence or absence of a touch memory device and thus which slots contain key tags and which do not. When a slot contains a key tag, the touch memory device of the tag is read to determine its ID code, from which the identity of the particular key on the tag can be determined through a table lookup. In this way, the absence or presence and location of the key tags and their associated keys can be noted by the controller each time the array of contacts are polled. If a tag present in a slot on a prior polling is absent on a subsequent polling, then the controller notes that that the tag and its key has been removed from the storage drawer. Conversely, if a key tag is detected in a previously empty slot, the controller notes that the tag and its key have been replaced in the storage drawer. The removal and replacement of keys is therefore continuously monitored.

An access feature requires an authorized user such a salesperson to enter an ID code to unlock and access the storage drawer. When the history of removal and replacement of key tags and their keys is combined with other information, such as the time at which tags are removed and replaced and the identities of the persons who accessed the drawer and times of access, access to the keys in the drawer can be controlled and a detailed tracking log can be created. This system greatly decreases instances of lost keys, reduces the time required to find checked-out keys, and generally provides automatic tracking and control of the keys, and thus, to a large extent, controls and tracks the vehicles to which they provide access.

While the Key Track system described above has proven extremely valuable in the tracking and control of keys, it nevertheless has been limited somewhat in the situations to which it is readily applicable. For example, the tags used with the system are made of thin relatively flat plastic material that generally provides for the attachment of a single or only a few keys to the tag. It has been difficult to attach a large collection of keys such as keys on a key ring and even more difficult to attach larger special function keys such as keys that incorporate electronic transmitters for locking and unlocking a car remotely. In these situations, it has been experienced that keys can fall or hang into the slots of the Key Track drawer and short out one or more of the contacts on the backplane, resulting in system errors or failure. While simply providing larger tags is helpful, it has not proven to be a complete solution. Furthermore, the system has generally been poorly applicable to the tracking of loose items such as, for example, jewelry, narcotics, and the like because such items cannot easily be attached to a tag. The present invention is intended to enhance and expand the basic Key Track system for application to these and other situations.

Another relative shortcoming of present electronic key tracking systems such as the Key Track system, and object tracking systems in general, has been limitations resulting from the fact that the keys are only detectable upon check-in and check-out at a central storage location. This has meant that tracking of keys has generally been limited to keeping a log of when the keys are physically removed and replaced in a central storage receptacle. The disposition of keys in the interim has not been trackable. Nevertheless, it is clearly useful to track the movement and use of keys and other objects in the interim between the times when they are checked out and checked back in at the central storage location. For example, in the case of tracking use of keys to apartments by maintenance personnel, it is desirable to know not only that a group of keys were checked out and checked back in at particular times, but also when the keys were used in the interim to access apartments. Such information can be useful, for example, when claims of theft or vandalism are levied against security personnel. It can also be useful in general security dispatching to insure that security guards check in at all required stations while making security rounds and to log the activities of such guards during their rounds. In the tracking of narcotics at a hospital, it is desirable to know when and by whom particular narcotics are checked out and checked back in and also the time at which the narcotics are accessed in the interim between check-out and check-in times. In this way, confirmation that patients receive the proper prescriptions at the proper times can easily be made by referring to the resulting log of check-out, access, and check in times. The basic Key Track system has not been readily applicable to such situations.

Thus, even though the Key Track system has proven very useful, there exists a continuing need to enhance the system by providing for the tracking of larger and bulkier keys and key collections, by providing for the tracking and control of the use of keys and other articles in the interim between check out and check in, and, in a more general sense, to provide for the tracking and control of larger or loose items such as jewelry and narcotics. It is to the provision of such enhancements and improvements that the present invention is primarily directed.

SUMMARY OF THE INVENTION

Briefly described, the present invention, in one preferred embodiment thereof, comprises enhancements to the Key Track system disclosed in my U.S. Pat. No. 5,801,628 to adapt the system for use in tracking and controlling large collections of or bulky keys, such as keys on a key ring or remote access transmitter keys, and in tracking and controlling larger or loose objects other than keys. The heart of the enhancement is a carrier or box adapted to contain a ring of keys, a larger electronic access key, or objects other than keys, such as, for example, jewelry or narcotics. In one embodiment, the carrier comprises a rectangular box-shaped container with an openable door panel on one side. The door panel may be hinged for access to the container or may be displacably or removably attached in another way such as by sliding attachment slots. In one configuration for use with keys on a key ring, the container has a slot on its bottom side and the key ring is provided with an ID tag having a relatively thin plastic tongue carrying a touch memory device. In use, the container is opened and the key ring is placed in the container with its ID tag extending through the slot in the bottom of the container. The container is then shut to contain the key ring and its keys whereupon the entire container can be selectively placed in and removed from the Key Track drawer with the protruding ID tag extending into one of the key tag slots in the drawer. The key ring is thus tracked and access to it controlled in the same manner as a single key attached to a traditional key tag.

To facilitate the alignment of containers with slots in the Key Track drawer, an overlay formed of stamped metal or a wire grid can be attached within the Key Track drawer overlying the slots. The overlay defines an array of openings, each sized to receive a container. The openings are positioned such that when a container is slid into one of the openings, the protruding ID tag is directed into one of the slots in the drawer allowing the controller to read the presence of the ID tag and its key ring within the drawer.

Another embodiment of the invention is intended for use with bulky keys having built in remote entry transmitters or with remote entry transmitters not combined with keys. It has previously been difficult to attach such items to a key tag in the traditional key track system. A smaller container, preferably made of molded plastic, is sized to contain a remote entry key or transmitter. The container comprises rectangular box having an open side for access. A tongue, similar to the tongues on the key tags of the Key Track system, is fixed to the bottom wall of the container and depends therefrom. A touch memory device is carried by the tongue and the tongue is configured to be inserted into the slots in the Key Track drawer. A sliding panel is adapted to slide onto the container from the bottom side thereof and to cover the open side for closing the container and capturing a key in the container. When a key is closed in the container, the container can be placed in one of the slots in a Key Track drawer with its tongue and touch memory device extending into the slot in the traditional way. The attached controller is thus able to detect and track the insertion and subsequent removal of the container from the drawer. Since the sliding panel is slid onto the box from the bottom to close the container, the panel cannot be removed for access to the key without first removing the container from the Key Track drawer, which will be detected by the controller. Thus, since the keys cannot be removed without detection, a measure of security for relatively expensive remote entry transmitters and keys is provided. In addition, since the key is closed within the container, it is protected and its identity cannot be determined simply by looking into the Key Track drawer. Only the controller is able to identify the location of a particular key within the drawer upon a proper query by an authorized user.

In yet another embodiment of the invention, the carrier and Key Track system are enhanced to expand the system beyond its traditional use for tracking keys to a general object tracking and control system. This embodiment is particularly useful for tracking valuable objects such as jewelry or for tracking the use of controlled substances such as narcotics and medication. A set of containers is provided, each container having a box with an open side and a hinged panel that covers the open side and closes the container. The container is provided with a slot or pocket in which a printed circuit board can be slid. The printed circuit board carries a memory device storing a ID code and may also carry other components such as a microcontroller, ancillary memory, an RF transmitter, an RFID tag, and related components. Conductive pads on the printed circuit board are coupled to the components on the board for electronically accessing the components.

A drawer or other storage receptacle is provided for receiving the containers of this embodiment. The drawer has an overlay panel formed with an array of openings or bays each sized to receive one of the containers. A printed circuit back plane is disposed behind the overlay panel and has a plurality of sets of conductive contacts, each set of contacts positioned to engage the conductive pads of a container's printed circuit board when the container is inserted into the corresponding bay. The contacts are wired in a data matrix, which is connected to a computer-based controller as in the traditional Key Track system. Use of this embodiment is similar to use of the traditional Key Track system. The controller detects and logs the removal and replacement of containers in the drawer by reading the ID codes of the memory devices associated with the containers.

This embodiment also may include a further enhancement wherein the printed circuit boards in the containers are more sophisticated and are configured to log the opening and closing of the container between the times when it is checked out and checked back in at the storage drawer. The container may also be provided with sensors to gather other information in the interim period such as, for example, the times when the container passed location transmitters, identification numbers from patient arm bands or ID buttons, or other information. This information can be downloaded to the controller upon check in and correlated with other information to provide valuable data compilations and reports. Such information is useful, for example, in the dispensing of drugs to patients in a hospital, where it is desired to log when the drugs are checked out, by whom, at what times the container was opened while checked out for access to the drugs stored inside, and the identities of patients provided with drugs. This information can be correlated to medication schedules for patients to insure that patients are being provided with the proper drugs at the proper times.

The printed circuit boards of this embodiment can be even further enhanced with simple RF transmitters and/or RFID tags available from a variety of manufacturers. RFID tags are adapted to transmit a code and/or other information to a receiver coupled to the computer-based controller and can be used as an alternative to touch memory devices. Other RF transmitters can be provided if desired to transmit a code upon the occurrence of prescribed events such as, for example, each time the door of the container is opened and its contents accessed. Such functionality provides for real time tracking of access to the container in the interim between check-out and check-in times.

Thus, an improved and enhanced method and system for tracking and controlling keys and other objects is now provided. The traditional Key Track system is enhanced to accommodate large numbers of keys on a key ring, bulky or unusually shaped keys and remote entry transmitters, and valuable or controlled loose objects other than keys. In one embodiment, object containers are provided with active electronics, which tracks and logs access to the container between the times when it is check out and checked back in. In another embodiment, an RF transmitter or RFID tag is provided for radio frequency communication to the controller. These and other features, objects, and advantages of the invention will become more apparent upon review of the detailed description set forth below taken in conjunction with the accompanying drawing figures, which are briefly described as follows.

DETAILED DESCRIPTION OF THE PREFERRED EMBODIMENTS

Figure 1:
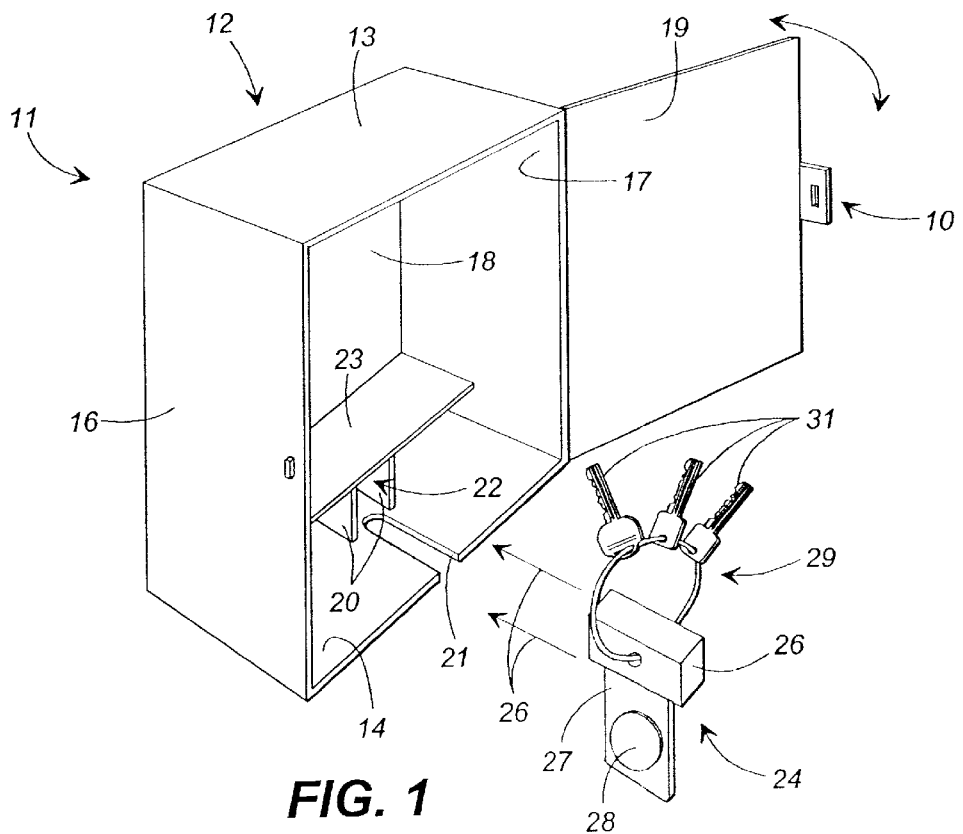
FIG. 1 is a perspective view of a closable carrier usable with the Key Track system to store and track large numbers of keys on a key ring.

Referring now in more detail to the drawings, in which like numerals refer to like parts throughout the several views, FIG. 1 illustrates a carrier for ringed keys that embodies principles of the invention in one preferred form. The carrier 11 comprises a generally rectangular box-shaped body 12 formed by a top panel 13, a bottom panel 14, a left side panel 16, a right side panel 17, and a back panel 18. A front panel 19 preferably is hinged along one side to the edge of the right side panel 17 (or, alternatively to the left or any other side panel) to provide a selectively closable hinged door on the carrier. Locking tabs 30 and 35 preferably are provided on the door and box. The locking tabs have holes that align with one another when the hinged door is closed. A lock or tamper evident ring can be inserted through the aligned holes. In this way, the carrier can be locked shut if desired so that only authorized personnel may access its contents. Alternatively, a tamper evident ring that, when cut, indicates that the carrier has been accessed may be provided. Finally, the carrier preferably is provided with an appropriate latch 10, which may be any suitable form of latch, for releasably latching the door shut when closed to hold the key ring securely in place.

The bottom panel 14 is provided with a slot 21 that extends from the front edge of the bottom panel to a position inwardly spaced from the front edge. A lateral partition 23 spans the left and right side panels and a pair of guide walls 20 extend between the partition 23 and the bottom panel 14 straddling the location of the slot 21 to define a guide slot 22 between the guide walls 20.

An ID tag 24 is adapted to be received in the guide slot 22 and comprises a head 26 from which a relatively thin tongue 27 depends. The head 26 is sized and shaped to slide, as indicated by arrows 25, into and fit partially within the guide 22 with its tongue 27 projecting downwardly through the slot 21. The tongue 27 may be formed of plastic if desired but also may be formed of a more durable and tamper resistant material such as stainless steel or aluminum. A tongue of stainless steel or aluminum renders the ID tag much less susceptible to tampering or defeat by cutting the ID tag and absconding with the keys, although it requires electrically isolated mounting of the touch memory device as described in more detail below. The location of the ID tag in the slot as described also serves to locate the key ring and the keys attached thereto in the upper portion of the carrier. In this way, the keys are isolated from the tag, are held in place in an organized fashion, and do not interfere with operation of the touch memory device.

The head 26 of the ID tag is adapted to be mounted on a key ring with a group of keys 31 (only a few of which are shown in FIG. 1 for clarity) and includes a hole for this purpose. A touch memory device, such as DS1990A touch memory device available from Dallas Semiconductor, is attached to and carried by the tongue 27 in a manner similar to that in which touch memory devices are carried by the key tags in the standard Key Track system. If the tongue 27 is made of plastic or other electrically insulating material, the touch memory device, which has a radially projecting rim at one end, is simply pressed through an appropriately sized hole in the tongue and secured with a mounting ring. In the event the tongue is made of steel, aluminum, or another conducting material, it may be necessary first to install an insulating spacer and then the touch memory device to insulate the touch memory device from the conductive mounting material of the tongue (see FIG. 8). In either case, the touch memory device is carried by the tongue as shown.

In use, the key ring 29 and keys 31 are placed in the carrier 11 as indicated by arrows 25 with the head 26 of the ID tag 24 being inserted into the guide 22 such that its tongue 27 projects downwardly from the container 12 through the slot 21. When so inserted, the keys and key ring reside in the upper portion of the carrier above the location of the partition 23 and the tongue 27 with its touch memory device projects downwardly from the bottom panel 14 through the slot 21. The front panel 19 can then be hinged shut to enclose and contain the keys and keep them from flopping about. The front panel can be releasably latched shut with latch 10 if desired and a lock or tamper evident ring can be installed in the locking tabs 30 and 35 for enhanced security.

Figure 2:
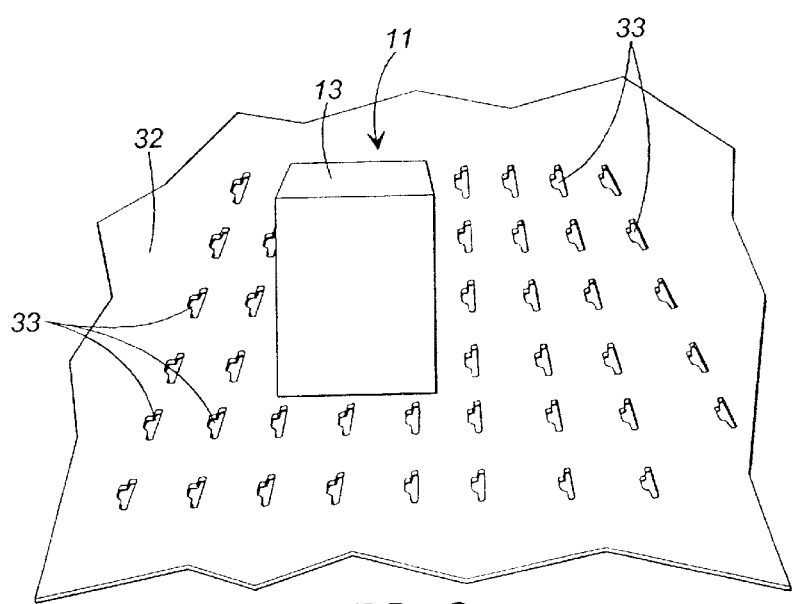
FIG. 2 illustrates the carrier of FIG. 1 inserted in one of the slots of a tray of the Key Track system.

When the front panel 19 is closed, the carrier 11 with keys inside forms a rectangular box as illustrated in FIG. 2 with the tongue 27 of the ID tag projecting downwardly from the bottom panel 14 of the box. The carrier can then be inserted into a Key Track tray 32 with the tongue of the ID tag extending into one of the slots 33 of the tray to engage the touch memory device with the pair of electrical contacts corresponding to the slot. The ID code stored in the touch memory device can then be read by the attached computer-based controller to determine the presence and location in the tray of the keys associated with the ID tag and to determine when the carrier and its keys are removed. The process, structure, and electronics for reading the touch memory device is described in detail in my U.S. Pat. No. 5,801,628 and also disclosed in the manufacturer's specifications and thus need not be described in detail here.

It will be noted from FIG. 2 that, when the carrier of the illustrated embodiment is inserted in a selected slot of the key track storage tray 32, the carrier covers the two slots of the tray on either side of the slot in which its ID tag extends, rendering these slots unavailable for use by other key tags or carriers. While the carrier is shown to cover two slots in FIG. 2, it will be understood that less or more slots might be covered and rendered inaccessible depending upon the size of the carrier. This does not represent a particular disadvantage, however, since the controller will simply read that the covered slots are unoccupied and key tags inserted in other available slots will still be detected and identified when they are present. Although a Key Track drawer will accommodate fewer carriers than traditional key tags, the advantage of tracking and controlling large numbers of keys on key rings in the same way that single keys on key tags are tracked far outweighs the disadvantage of any reduced capacity of the drawer. As detailed below, custom overlays or custom trays may also be used to accommodate the carriers if desired. Further, additional drawers can be added to the system as need to accommodate larger numbers of key tags and carriers and any mix of object carriers and key tags can be used with the existing drawer configuration of the Key Track system.

Figure 3A:
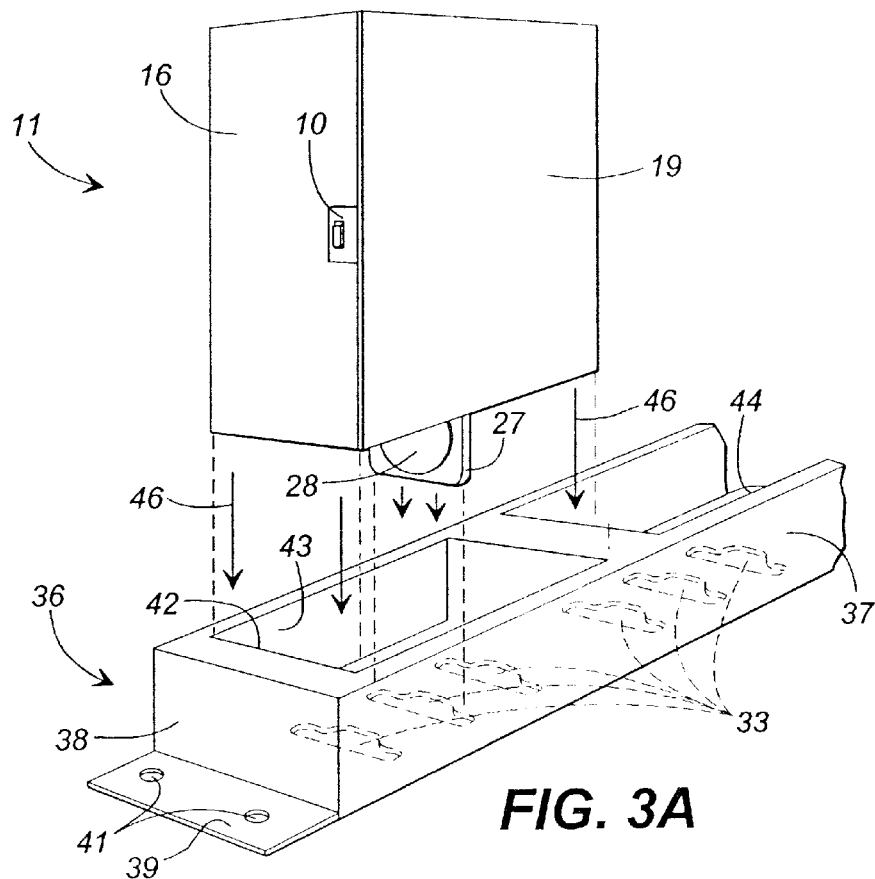
FIG. 3A illustrates a guide or overlay usable with the Key Track system and carrier of FIG. 1 to align and secure the carrier, prevent its opening while mounted in the tray, and to partition the slots of the tray to receive multiple carriers.

FIG. 3A illustrates an enhancement of the carrier system of FIGS. 1 and 2. Here, an overlay or guide 36 is provided for covering a row of slots 33 in the Key Track tray and providing a positioning guide for a plurality of carriers 11. The guide 36, which can be formed of punched and bent sheet metal, comprises opposed sides 37 and opposed ends 38 (only one end is visible in FIG. 3) that form a generally rectangular box shaped structure. A flange 39 is provided at the bottom of each end 38 and holes 41 are bored in the flange for attaching and securing the guide 36 to the Key Track tray 32. The top 40 of the guide 36 is formed to define at least one socket or receptacle 42 that is sized to receive the carrier 11 therein. Preferably, the receptacle 42 is provided with guide flanges 43 projecting downwardly therefrom to guide the carrier 11 into the receptacle when it is inserted therein as indicated by arrows 46.

Additional receptacles 44 are also provided in the guide 36 extending therealong and defining an array of carrier receptacles. The guide 36 thus functions to provide an array of receptacles for receiving carriers 11 with each socket properly aligning its respective carrier with a selected slot 33 in the Key Track tray. In addition, the receptacles hold the hinged front panels 19 of the carriers shut when they are in position within the receptacles. This is important because it prevents a thief from opening the receptacle without first removing it from the tray, which will be detected by the controller. If an unauthorized removal is detected by the controller, appropriate alarms can be generated and actions taken to alert security personnel. Thus, an extra measure of security is provided by the overlay.

Figure 3B:
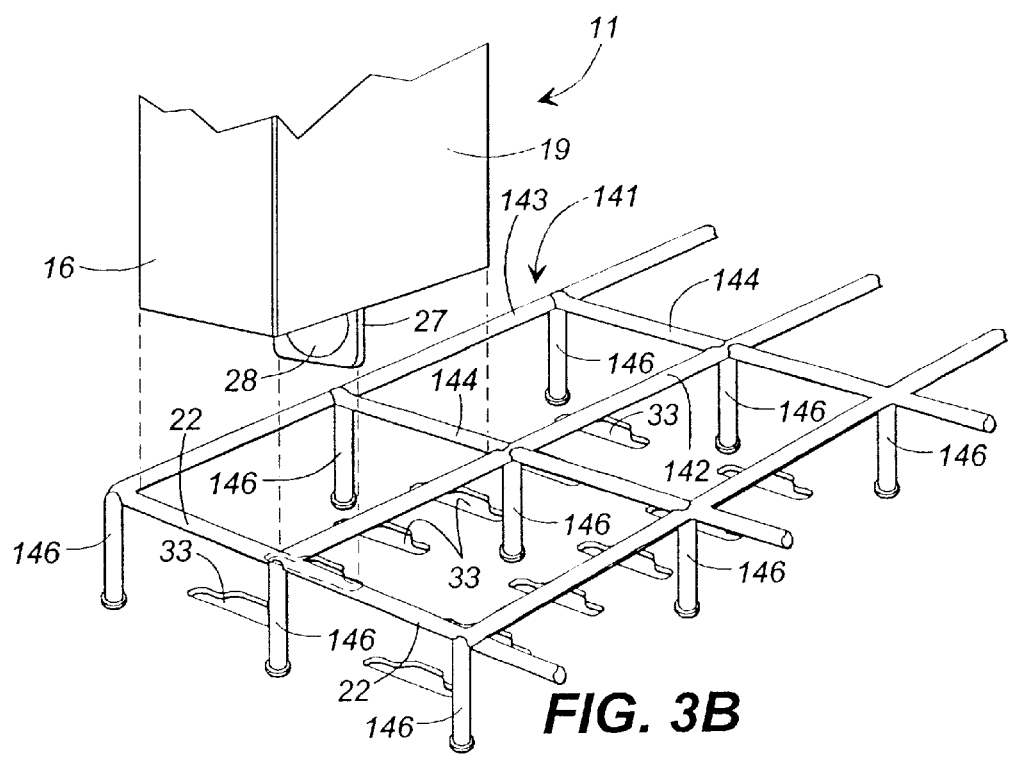
FIG. 3B illustrates another embodiment of the container guide in the form of a wire grid defining slots for receiving and aligning carriers.

FIG. 3B illustrates an alternate embodiment of a carrier guide or overlay for attachment to a Key Track tray to partition the tray into receptacles for receiving carriers. In this embodiment, the tray 32 of a key track drawer is shown with an array of slots 33 for receiving tongues of key tags bearing touch memory devices. A carrier 11, as previously described, is formed of a box 16 and a closable hinged door 19. A tongue 27 depends from the carrier and bears a touch memory device 28. A wire frame guide 141 is formed with spaced apart elongated rails 142 bridged by a set of spaced apart connecting segments 144. The rails 142 and connecting segments 144 define an array of rectangular receptacles, each sized to receive a carrier 11, as indicated by the arrows in FIG. 3B.

Vertically depending legs 146 project downwardly from the rails 142 and 143 and are anchored to the key track tray with appropriate fasteners such as shoulders and bolts. The legs 146 secure the wire frame guide to the key track tray and properly position the rectangular receptacles so that when a carrier 11 is inserted into one of the receptacles, the tongue 27 thereof is directed into one of the slots 33. Thus, the wire frame guide performs a function similar to that of the guide of FIG. 3A, but with a less expensive wire frame structure. Further, since the wire frame is more open than a bent metal guide, the slots 33 can be used with traditional key tags when not holding a carrier and much better visibility is provided for visually identifying the objects in the tray. A simple two row guide is shown in FIG. 3B. It should be understood, however, that multiple row guides are possible and within the scope of the invention. Indeed, the entire key track panel could be overlaid with a wire grid allowing insertion of carriers and/or key tags in any combination. Further, the us of guides such as those illustrated in FIGS. 3A and 3B allows the carriers of this invention to be used with vertically oriented panels and backplanes that may be, for example, mounted on a wall. More efficient storage configurations are therefore possible.

Figure 4:
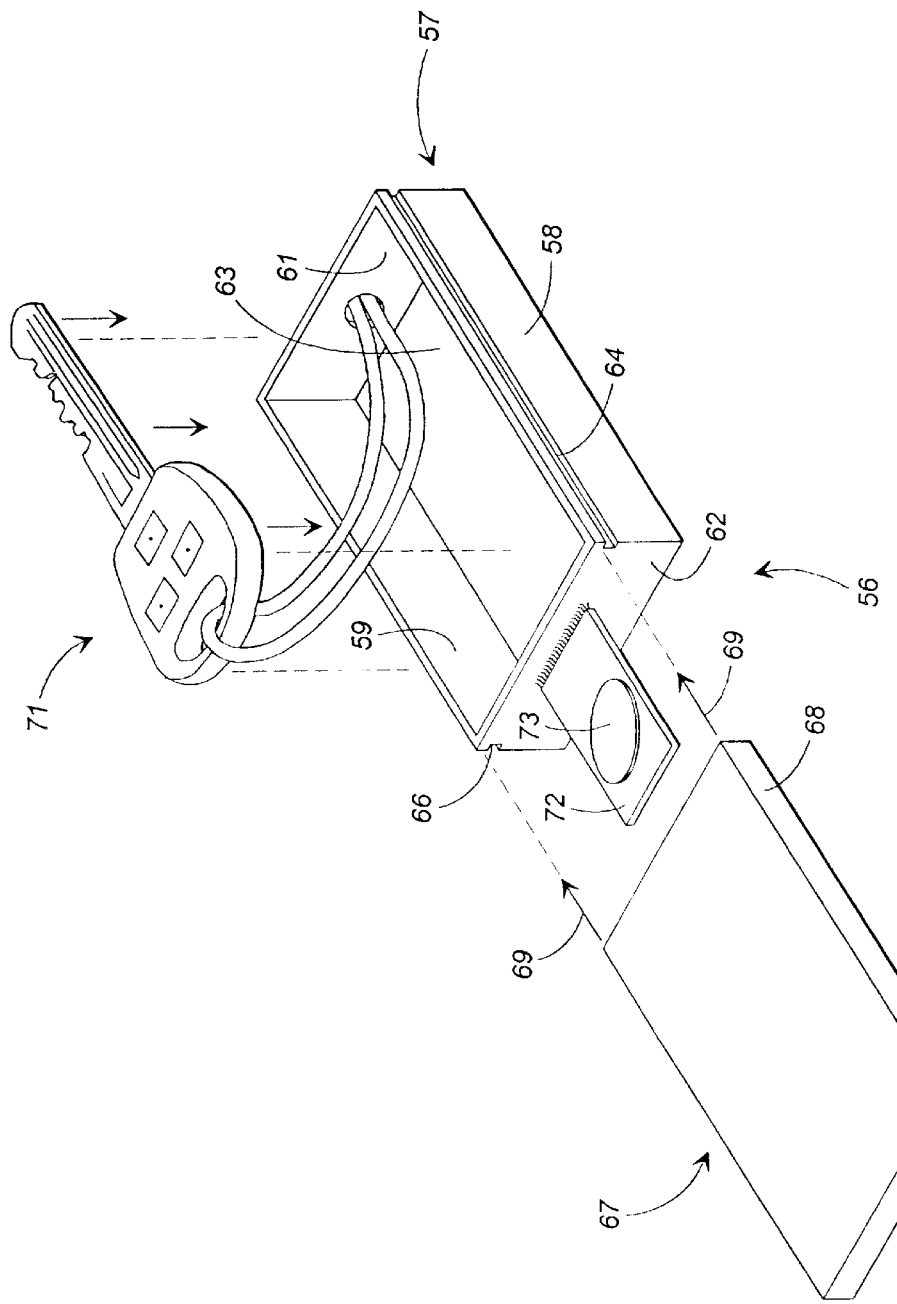
FIG. 4 is a perspective exploded view of an alternate embodiment of the carrier for use with the Key Track system when it is desired to track unusually shaped or sized keys, such as keys incorporating remote entry transmitters.

FIG. 4 illustrates another carrier for use with the Key Track system. This carrier is designed to allow odd shaped, bulky, or expensive keys to be tracked with the key track system in the same way as a loose key attached to an ID tag. These types of keys include keys, such as key 71, with large heads that incorporate transmitters for remotely locking and unlocking the doors of a vehicle to which they correspond. Remote door lock transmitters not incorporated into the vehicle key can also be tracked as well as other small items. The carrier 56 comprises a case 57, which can be made of molded plastic or other appropriate material. The case 57 is formed by a right side panel 58, a left side panel 59, a top panel 61, a bottom panel 62, and a back panel 63, which, in the preferred embodiment, are unitarily molded of plastic. The side panels 58 and 59 are formed with respective grooves or races 64 and 66 that extend along the outside top edges thereof. The grooves 64 and 66 are shaped and sized for slidably receiving a sliding cover 67 having depending sides or skirts 68 on three sides thereof. Inwardly opposed ribs (not visible in FIG. 4) are formed on the inside portions of the side skirts 68 and are sized and positioned to slide into the grooves 64 and 66 when the sliding cover 67 is moved onto the case 57 as indicated by arrows 69. In this way, the case can be closed with a key or other item inside by sliding the cover onto the case.

An ID tab 72 is provided with a touch memory or other ID device 73 and is secured at one end to the bottom panel 62 of the case 57. The ID tab is sized and configured to be inserted into a selected slot of a Key Track tray. In use, a key 71 is placed in the carrier and closed therein by sliding the sliding cover 67 into place. Preferably, the key is secured to the box with a loop of cabling or other appropriate tether (not shown) to prevent the box from becoming separated from its key. The carrier is then stored on the Key Track tray by inserting its ID tab into a selected slot of the tray. The Key Track controller can then track and control access to the key within the carrier in the usual way. Preferably, the carrier 57 is sized to take up no more than one space on the Key Track tray so that other key tags or carriers can be inserted into adjacent slots of the tray.

The carriers of FIGS. 1 through 4 have been described in terms of the storage and tracking of keys. It will be clear to those of ordinary skill in the art, however, that a wide variety of items can be stored in the carriers and thus tracked by the key track controller. For example, use of these carriers might convert a car key tracking system into a system for tracking jewelry, narcotics, or other small valuable or dangerous items. An added advantage when tracking such items is that the items are concealed and hidden within their carriers. According, only the Key Track controller is able to inform an authorized user of the location within the drawer of each item. An unauthorized user or would be thief cannot simply look into a drawer full of carriers and locate any particular item. Other uses for the carriers of this invention might be conceived by those of skill in the art such that, clearly, the present invention is not intended to be limited just to the storage and tracking of keys.

Figure 5:
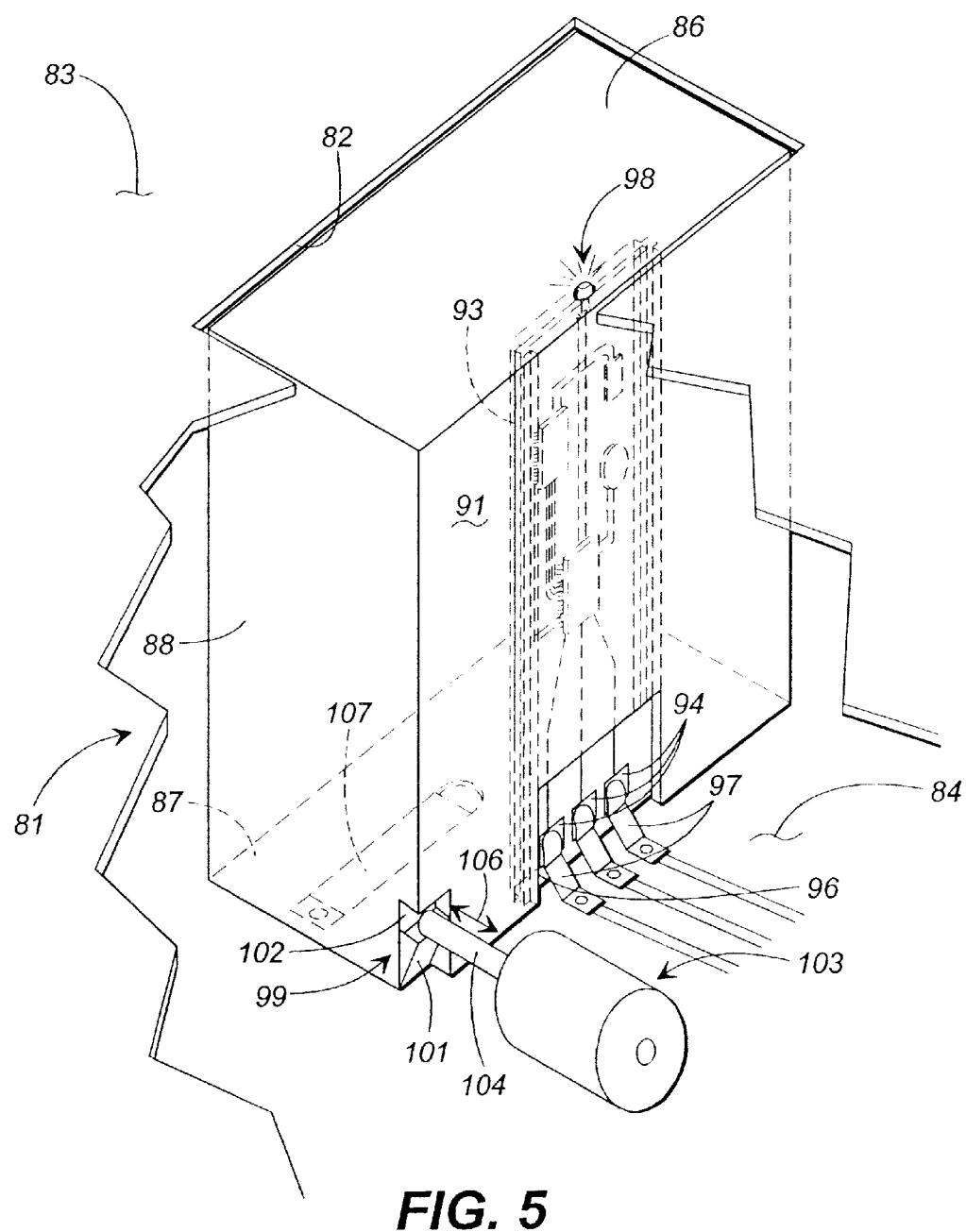
FIG. 5 is a perspective partially cut-away view of an embodiment of the invention in the form of an object tracking system for tracking objects such as jewelry or narcotics.
Figure 6:
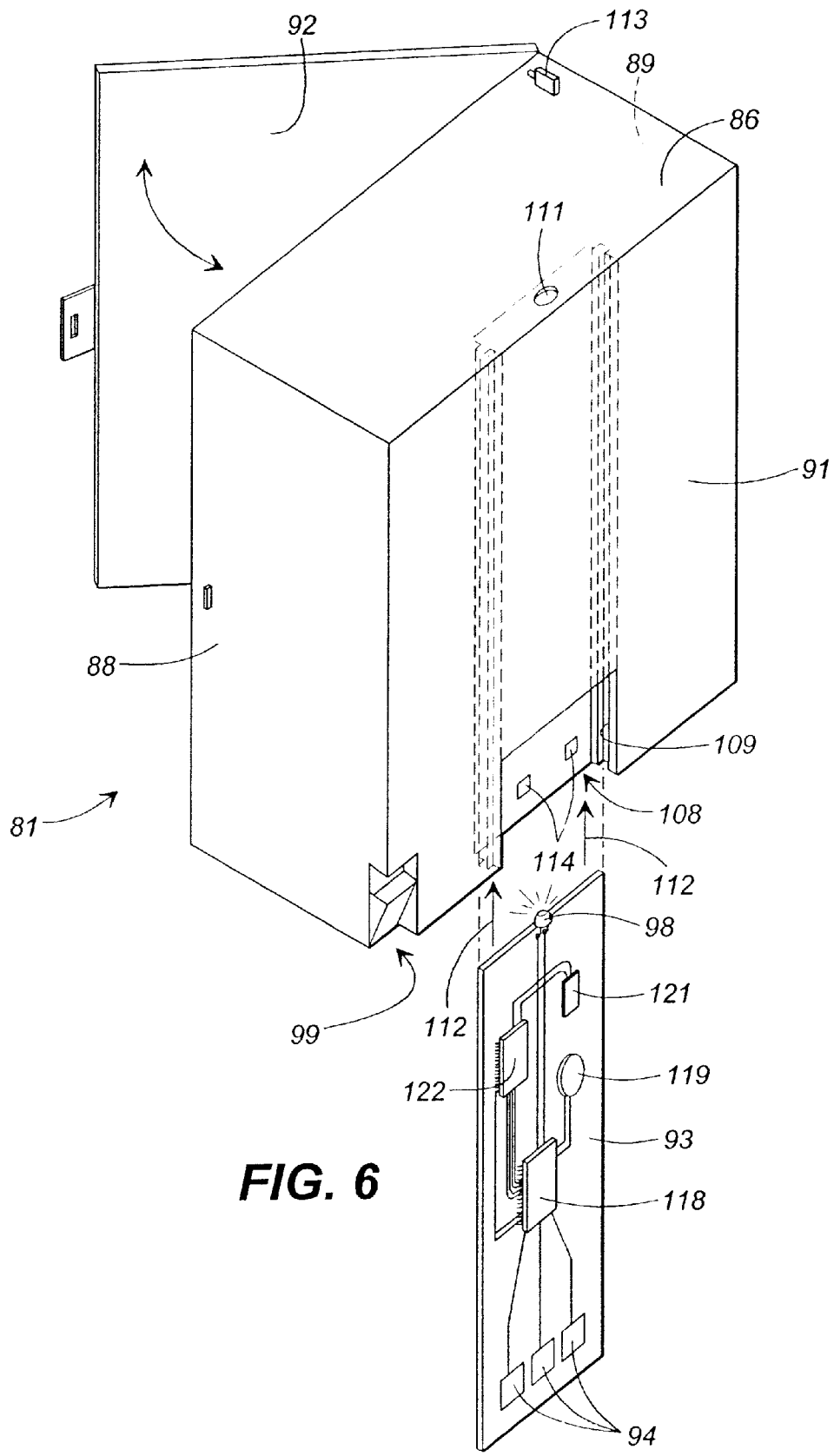
FIG. 6 is a perspective partially exploded view of the carrier of the embodiment of FIG. 5 illustrating the removable printed circuit board thereof.

FIGS. 5 and 6 illustrate an object tracking and control system that embodies principles of the present inventions in yet another form. The object tracking system illustrated in these figures can be used to store, monitor, and track a wide variety of items from automotive keys and apartment keys to narcotics and jewelry, to important files or papers. The system comprises a carrier 81 that, in the illustrated embodiment, is a rectangular box, for containing items to be tracked and controlled. The carrier 81 is sized to be received in a rectangular socket 82 formed in the surface of a receptacle panel 83. The panel 83 may be formed with a large array of receptacles for receiving and continuing a corresponding large number of carriers.

A back plane 84 is mounted behind or beneath the receptacle panel 83 and preferably is spaced therefrom a distance substantially equal to the height of the rectangular carrier 81. In this way, when the carrier is inserted into the receptacle 82 to the back plane, its top panel 86 is substantially flush with the surface of the receptacle panel 83. As described in more detail below, this configuration inhibits a thief from removing the carrier from the receptacle panel by force.

It will be understood that while only one receptacle and one carrier is illustrated in FIG. 5 for clarity of description, a complete system preferably would include a receptacle panel formed with an array of a plurality of receptacles for receiving a plurality of carriers.

In addition to its top panel 86, the carrier 81 is formed with a bottom panel 87, a left side panel 88, a right side panel 89, a back panel 91, and a hinged front panel 92 (FIG. 6). The back panel 91 in the preferred embodiment is formed with a slot or pocket 108 that extends from the bottom panel 87 to the top panel 86. The pocket 108 has an opening 96 formed therein adjacent the bottom panel of the carrier. The pocket is sized to receive and hold a relatively narrow printed circuit board 93 with a portion of the bottom edge of the printed circuit board exposed through the opening 96 for purposes described in more detail below.

The lower left-hand corner of the carrier 81 is formed with a latch 99 defined by a sloped strike 101 and an indentation 102. A solenoid and plunger assembly 103 is mounted to the back plane 84 at a position adjacent the location of the latch 99 by means of an appropriate mounting bracket (omitted from FIG. 5 for clarity). The assembly 103 includes a plunger 104 that is spring biased to its extended position (the spring assembly is not shown in FIG. 5 but spring biased solenoid assemblies are available commercially, are well known to those of skill in the art, and can be retracted by application of a control voltage to the solenoid.) The strike 101 formed on the carrier is positioned to engage and retract the spring biased plunger 104 of the solenoid 103 when the carrier is inserted into the receptacle 82. When the carrier is fully inserted, the plunger 104 snaps into the indentation 102 to lock the carrier in place within the receptacle. The carrier can be released with an appropriate control signal from the controller to retract the plunger 104 from the indentation 102. Thus the strike and plunger form an electronically releasable lock that secures the carrier in place in its receptacle until an appropriate signal is provided by the controller. Similar locks can also be provided with the carrier embodiments of FIGS. 1 through 4 if desired.

A leaf spring or other spring 107 preferably is provided for exerting upward biasing force on a carrier locked in the receptacle. In this way, when the carrier is released by applying an appropriate control signal to the solenoid 103 to retract its plunger, the leaf spring causes the carrier to "pop" up out of the receptacle so that it can be grasped for removal.

As illustrated in FIG. 5 and perhaps best seen in FIG. 6, the circuit board 93 within the pocket 108 is etched to expose a set of conductive pads 94 positioned to be exposed through the opening of the pocket 96 when the circuit board is in place therein. A set of corresponding contacts 97 (FIG. 5) are fixed to the back plane 84 and are positioned for electrically contacting the conducting pads 94 when the carrier is inserted completely into the receptacle 82. The contacts 97 are coupled through a data matrix or other appropriate communications buss to a remote computer-based controller as described in my prior U.S. patent for connecting the electronic components of the circuit board to the controller.

Referring now to FIG. 6, the carrier 81 is illustrated with its hinged front panel 92 (which may also be a sliding or other appropriate type of panel) open and with the circuit board 93 displaced from the pocket 108 of the carrier. Arrows 112 indicate insertion of the circuit board 93 into the pocket 108. Once a circuit board is inserted and locked into place within a carrier, it becomes associated with the carrier and thus associated with articles stored in the carrier.

The circuit board 93 carries integrated circuit components for performing the method of the invention. In one embodiment, for example, the circuit board 93 is provided with a touch memory chip such as the touch memory devices provided on ID tags as discussed above. In this case, the chip preferably is surface mounted to the board to save space rather than being housed in a metal case or button. However, the primary function of the memory chip remains the same; that is, to store and transmit its unique internal code when appropriately polled with a polling signal. The memory chip is electrically coupled to the conducting pads 94 at the bottom of the circuit board and the contacts 97 on the back plane are configured and positioned to engage the conductive pads for receiving the ID code of the memory device and transmit it through the data matrix to the controller for detecting the absence or presence and location of the associated carrier within one of the receptacles.

Alternatively, the circuit board might be provided with more sophisticated electronics including a microcontroller or microprocessor 118 and associated components including a crystal 121 and battery 119. A wide variety of configurations are possible and a simple circuit is depicted in FIG. 6 for clarity. The microcontroller, which includes internal memory, may be coupled to an integrated circuit RF transmitter that can be actuated by the microcontroller. A reed switch 113 can be coupled to the front panel of the carrier for communicating a signal to the microcontroller 118 whenever the front panel 92 of the carrier is opened or closed. A light emitting diode (LED) 98 is provided at the top of the circuit board 93 and projects through an opening 111 in the top of the carrier when the board is inserted into the pocket 108. Preferably, the microcontroller is programmed to light the led whenever the carrier is selected by the system controller of the tracking system. In this way, a user can easily find a selected carrier by identifying the carrier to the controller, whereupon the controller lights the LED of the selected carrier and releases it by actuating the appropriate solenoid.

The embodiment of FIGS. 5 and 6 has many and varied applications. For example, the microcontroller 118 preferably is programmed such that, during the time the carrier is removed from its storage location, a record is kept in the memory of the microcontroller of the times when the hinged front panel of the carrier is open or closed. When the carrier is returned to its storage location, this stored data is downloaded and becomes a record of the use of the carrier and its contents between the times it was checked-out and checked back in.

Alternatively, the microcontroller can be programmed to activate the RF transmitter at intermittent times while the carrier is checked out or to activate the transmitter whenever the door of the carrier is opened or closed. This information, when transmitted back to the main computer based controller, can be tallied in real time as a means of tracking use of the contents of the carrier. These capabilities are useful in a wide variety of situations such as, for example, to track not only when medication was checked out to give to a patient, but the time at which the carrier was opened to administer the medication. Questions about medication delivery can thus be readily answered. A wide variety of other sensors and data gathering capabilities can be provided in such a carrier embodiment including, but not limited to, biometrics information, time and ambient temperature information, information gathered through data ports, and information from various types of on board switches. Further, with on board intelligence, enhanced substantially autonomous functionality is possible. For example, the carrier may be provided with an internal lock that is activated only when an authorized user has checked out or attempts to open the carrier.

Another use of the embodiment of FIGS. 5 and 6 is in tracking keys to an apartment complex. One carrier might, for example, house keys to an entire floor of apartments with each key coupled to the microcontroller so that the microcontroller can detect when a specific key is removed. A detailed record of when the key set was checked out and when each specific key was removed from the carrier is thus easily maintained for use in verifying when personnel had access to particular apartments. The use of RF transmitters associated with objects expands the effectiveness of tracking systems greatly.

Figure 7:
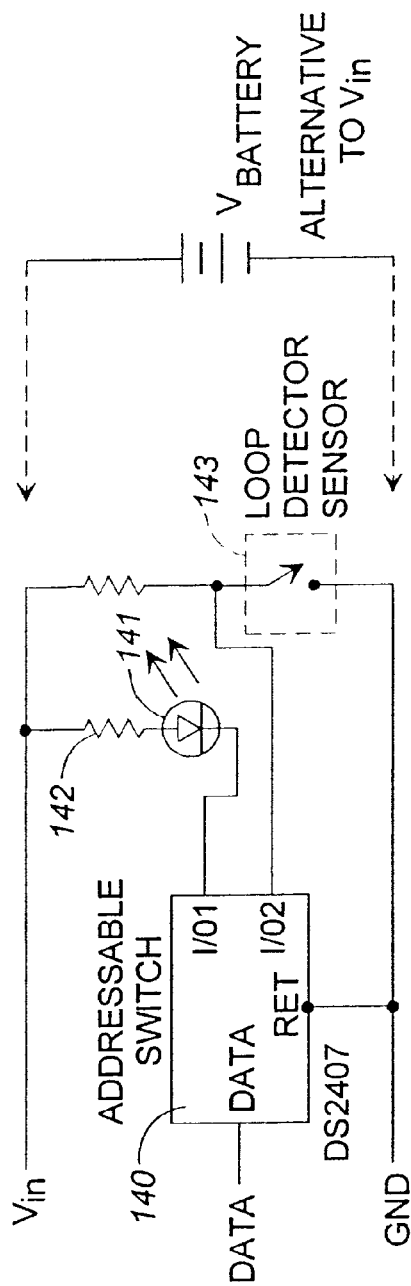
FIG. 7 is a functional electronic schematic diagram showing a preferred circuit for use with the embodiment of FIG. 5.

FIG. 7 is a functional schematic diagram of a circuit usable in the implementation of the embodiment of FIGS. 5 and 6. The circuit comprises an addressable switch in the form of an integrated circuit coupled to the ground, data, and Vin pads of the circuit board. The switch can be a DS2074 or other appropriate commercially available chip if desired. I/O 1 of the addressable switch 140 is coupled through an LED 141 and a current limiting resistor 142 to supply voltage Vin. As an alternative to drawing Vin from the backplane of an object tracking system, a battery 143 can be provided on the circuit board, in which case only two pads 94 (FIG. 6), one for a data line and one for a ground, are required. I/O 2 of the addressable switch 140 is coupled to an on board sensor, which may be a loop detector sensor to detect when an object is removed from the carrier, a reed switch to detect opening of the carrier, of another type of sensor depending on the intended use of the system. Other I/O ports of the switch preferably are coupled to other switches or elements, such as locks, latches, etc. In use, data can be provided to or read from the addressable switch 141 through the backplane of an object control system. In this way, the central controller of the system is able to download information from the switch regarding events recorded in the interim between check out and check in of the carrier, upload instructions to the carrier to, for example, turn on its LED, unlock its cover, or otherwise.

Figure 8:
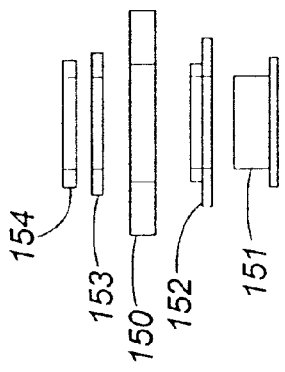
FIG. 8 is an exploded view illustrating the mounting of a touch memory device in a conducting rather than a non conducting tag.

FIG. 8 illustrates a preferred method of attaching or mounting a touch memory device to a steel, aluminum, or other conducting plate material, which may be used instead of a plastic tongue for added security. An opening is formed in the conductive mounting material 150 and the opening is sized for receiving an insulation spacer 152 through which a touch memory ID button is received. An insulating washer 153 is secured around the touch memory button on the other side of the mounting material and a crimp ring is secured around the touch memory button to secure it firmly in place within the opening. In this way, touch memory buttons can be mounted in metal tags for added security while remaining electrically isolated from the tags, which is required for proper operation.

The invention has been described herein in terms of preferred embodiments and methodologies. It will be obvious to those of skill in the art, however, that various additions, deletions, and modifications might well be made to the illustrated embodiments without department from the spirit and scope of the invention as set forth in the claims.

What is claimed is:

1. An item tracking and control system comprising:
   a trackable object corresponding to each item to be tracked;
   a storage unit for removably receiving and storing a plurality of said trackable objects and the items corresponding thereto;
   each of said trackable objects being provided with an electronic circuit that includes storage for storing at least an identification code associated with said trackable object and thus associated with the item corresponding to said trackable object, said electronic circuit being coupled to a visual indicator on said trackable object;
   a computer-based controller associated with said storage unit and programmed to receive used input and to generate a request for one of said items, said request including at least the identification code the requested item;
   a communications link in said storage unit for communicating requests from said controller to the electronic circuits of trackable objects in said storage unit;
   said electronic circuit of each trackable object activating said visual indicator on said trackable object when a request that includes an identification code corresponding to the identification code associated with said trackable object and its corresponding item is communicated from said controller through said communications link, the activation of said visual indicator identifying the item requested in said user input.

2. An item tracking and control system as claimed in claim 1 and wherein said trackable objects comprise containers, each container for containing the items corresponding thereto.

3. An item tracking and control system as claimed in claim 1 and wherein said items comprise keys.

4. An item tracking and control system as claimed in claim 3 and wherein said trackable objects comprise containers, each of said containers for containing keys corresponding thereto.

5. An item tracking and control system as claimed in claim 1 and wherein each of said visual indicators comprises an LED.

6. An item tracking and control system as claimed in claim 1 and wherein each of said electronic circuits includes a microprocessor.

7. An item tracking and control system as claimed in claim 1 and wherein each of said electronic circuits includes a microcontroller.

8. An item tracking and control system as claimed in claim 1 and wherein each of said electronic circuits includes an addressable switch.

9. An item tracking and control system as claimed in claim 1 and further comprising an array of receptacles in said storage unit, each receptacle for removably receiving a trackable object.

10. An item tracking and control system as claimed in claim 9 and wherein each of said trackable objects comprises a container for containing items corresponding thereto and wherein said receptacles are configured to receive said containers.

11. An item tracking and control system as claimed in claim 10 and wherein each of said containers is provided with electrical contacts coupled to the electronic circuit of said container and wherein said communications link includes electrical contacts associated with said receptacles, said electrical contacts of a trackable object engaging said electrical contacts associated with a receptacle when said trackable object is received in said receptacle.

12. An item tracking and control system as claimed in claim 1 and wherein said storage unit comprises at least one drawer.

13. An item tracking and control system as claimed in claim 12 and further comprising an array of receptacles in said drawer, each receptacle for removably receiving a trackable object.

14. An item tracking and control system as claimed in claim 13 and wherein said electronic circuit of each of said trackable units includes an addressable switch.

15. An item tracking and control system as claimed in claim 14 and wherein said items are keys.

16. An item tracking and control system as claimed in claim 15 and wherein said trackable objects comprise containers for containing keys corresponding to said containers.

17. A key tracking and control system comprising:
    a trackable object associated with each key to be tracked;
    a storage unit for removably receiving and storing a plurality of keys and their associated trackable objects;
    each of said trackable objects being provided with an electronic circuit including electronic storage storing an identification code identifying said trackable objects and thus identifying the keys associated therewith;
    an LED on each of said trackable objects, each LED being coupled to and activatable by said electronic circuit of said trackable object;
    a controller programmed at least to receive user input requesting a desired key;
    a communications link coupling said controller to trackable objects contained within said storage unit, the identification code corresponding to the trackable object of a user requested key being communicated by said controller via said communications link;
    the electronic circuit of each of said trackable objects being configured to activate the LED on the trackable object following receipt via said communications link of an identification code matching the code stored in the storage of said electronic circuit, thereby identifying the location of the requested key to a user.

18. A key tracking and control system as claimed in claim 17 and wherein said electronic circuit includes a microprocessor.

19. A key tracking and control system as claimed in claim 17 and wherein said electronic circuit includes a microcontroller.

20. A key tracking and control system as claimed in claim 17 and wherein said electronic circuit includes an addressable switch.

21. A key tracking and control system as claimed in claim 17 and wherein said trackable objects comprise containers for containing keys associated therewith.

22. A key tracking and control system as claimed in claim 21 and further comprising an array of receptacles in said storage unit, each receptacle configured to receive one of said containers.

23. A key tracking and control system as claimed in claim 22 and wherein each of said containers is provided with electrical contacts coupled to said electronic circuit and wherein said communications link includes electrical contacts associated with each of said receptacles, the electrical contacts of a receptacle engaging the electrical contacts of a container when the container is received in said receptacle for communication with said controller.

24. A system for tracking items at a storage location comprising:
- a trackable object corresponding to each item to be tracked;
- each of said trackable objects being provided with electronics including a memory storing an identification code associated with said trackable object and thus identifying items corresponding thereto;
- a visual indicator on each of said trackable objects coupled to and activatable by said electronics;
- a storage unit at said storage location for removably receiving said trackable objects;
- a controller programmed to receive user input including at least a user request for a desired item; and
- a communications link coupling said controller to the electronics of trackable objects is said storage unit and for transmitting the identification code of a user requested item to said trackable objects;
- said electronics of each of said trackable objects being configured to activate the visual indicator of its corresponding trackable object following receipt from said controller of an identification code corresponding to the identification code stored in the memory of said electronics of said trackable object, the activated visual indicator identifying a trackable object and its corresponding item regardless of the location of said trackable object in said storage unit.

25. A system for tracking items at a storage location as claimed in claim 24 and further comprising an array of receptacles in said storage unit, each receptacle configured to receive a trackable unit.

26. A system for tracking items at a storage location as claimed in claim 25 and wherein the items are keys.

27. A system for tracking items at a storage location as claimed in claim 26 and wherein said trackable objects are attached to the keys corresponding thereto.

28. A system for tracking items at a storage location as claimed in claim 27 and wherein said trackable objects comprise containers and wherein keys corresponding to each of said containers are stowable in said container.

29. A system for tracking items at a storage location as claimed in claim 28 and further comprising electrical contacts on each of said trackable objects and wherein said communications link includes electrical contacts associated with each of said receptacles, said electrical contacts of each of said trackable objects engaging said electrical contacts of a receptacle within which the trackable object is disposed for communication between said controller and the electronics of said trackable object.

30. A system for tracking items at a storage location as claimed in claim 28 and wherein said electronics includes a microprocessor.

31. A system for tracking items at a storage location as claimed in claim 28 and wherein said electronics includes a microcontroller.

32. A system for tracking items at a storage location as claimed in claim 28 and wherein said electronics includes an addressable switch.

33. An item tracking and control system comprising:
- a trackable object corresponding to each item to be tracked;
- a storage unit for removably receiving and storing a plurality of said trackable objects and the items corresponding thereto;
- each of said trackable objects having an electronic circuit that includes storage for storing at least an identification code associated with said trackable object and thus associated with the item corresponding to said trackable object, said electronic circuit being coupled to a visual indicator on said trackable object;
- a controller associated with said storage unit;
- a communications link coupling said controller to said storage unit for communication of information from said controller to the electronic circuits of trackable objects in said storage unit;
- said controller being programmed to generate a request and to broadcast said request over said communications link, said request including at least the identification code associated with one of said trackable objects and its item;
- each electronic circuit being capable of activating the visual indicator on its trackable object following receipt of a request that includes the identification code associated with said trackable object in order to identify a requested trackable object visually to a user.

34. An item tracking and control system as claimed in claim 33 and wherein said items comprise keys.

35. An item tracking and control system as claimed in claim 33 and wherein said trackable objects comprise containers for containing items to be tracked.

36. An item tracking and control system as claimed in claim 33 and wherein said visual indicators comprise LEDs on said trackable objects.

37. An item tracking and control system as claimed in claim 33 and wherein each of said electronic circuits includes a microprocessor.

38. An item tracking and control system as claimed in claim 33 and wherein each of said electronic circuits includes a microcontroller.

39. An item tracking and control system as claimed in claim 33 and wherein each of said electronic circuits includes an addressable switch.

40. An item tracking and control system as claimed in claim 33 and further comprising an array of receptacles in said storage unit, each receptacle for removably receiving a trackable object.

41. An item tracking and control system as claimed in claim 40 and wherein each of said trackable objects comprises a container for containing items corresponding thereto and wherein said receptacles are configured to receive said containers.

42. An item tracking and control system as claimed in claim 41 and wherein each of said containers is provided with electrical contacts coupled to the electronic circuit of said container and wherein said communications link includes electrical contacts associated with said receptacles, said electrical contacts of a trackable object engaging said electrical contacts associated with a receptacle when said trackable object is received in said receptacle.

43. An item tracking and control system as claimed in claim 42 and wherein said items are keys containable in said containers.

44. A method of identifying a selected trackable object from among a plurality of trackable objects in a storage unit of an object tracking and control system, each trackable object including a stored identification code, said method comprising the steps of:
- (a) receiving information corresponding to a user of the object tracking and control system;
- (b) generating a transmittable request for a selected one of the trackable objects based on the information received in step (a), the request containing at least the identification code of the selected trackable object;

(c) transmitting the request generated in step (b) to the plurality of trackable objects within the storage unit; and (d) activating a visual indicator on the trackable object whose identification code corresponds to the identification code included within the request to identify the requested trackable object visually to a user.

45. The method of claim 44 and further including at least one item associated with each of said trackable objects and wherein step (a) includes receiving user instructions requesting the selected item.

46. The method of claim 45 and wherein the items are keys.

47. The method of claim 44 and wherein the trackable objects are containers.

48. A system for tracking a plurality of keys comprising:

a plurality of trackable objects each attachable to a key to be tracked;

an addressable switch in each of said trackable objects, each addressable switch storing an identification code;

an LED on each of said trackable objects coupled to said addressable switch;

a storage unit for removably receiving said trackable objects and their attached keys, said storage unit including a plurality of receptacles for receiving trackable objects;

a controller associated with said storage unit;

a communications link coupling said controller to said plurality of receptacles for communicating information from said controller to the addressable switches of trackable objects in said receptacles;

said controller being programmed to receive input from a user and to generate a request and broadcast the request via said communications link to the addressable switches of trackable objects within said storage unit, said request including at least an identification code;

each addressable switch being configured to activate the LED on its trackable object upon receipt via said communications link of a request that includes an identification code matching the identification code of said addressable switch to identify visually to a user the location of said trackable object within said storage unit.

49. A system for tracking a plurality of keys as claimed in claim 48 and wherein each of said addressable switches is a Dallas DS2404 chip.

50. A system for tracking a plurality of keys as claimed in claim 48 and wherein each of said trackable objects is provided with electrical contacts coupled to said addressable switch and wherein each of said receptacles includes electrical contacts that engage the electrical contacts of a trackable object in said receptacle, said communications link being coupled to the electrical contacts of said receptacles.

51. A system for tracking a plurality of keys as claimed in claim 50 and wherein said communications link includes electrical conductors connected to the electrical contacts of said receptacles.

52. A system for tracking a plurality of keys as claimed in claim 51 and wherein said electrical conductors are each connected in parallel to a respective electrical contact of a plurality of said receptacles.

53. In a key tracking system wherein a plurality of keys are each attached to a trackable object and are removably storable in a storage unit, the keys being individually requestable by a user via a computer controller coupled to said storage unit, the improvement comprising an LED on each trackable object and an electronic circuit in each trackable object coupled to said LED, each of said electronic circuits being adapted to light its LED when a key attached to the trackable object is requested by the user to identify to the user the location of the requested key within the storage unit.

54. The improvement of claim 53 and wherein each of said electronic circuits includes an addressable switch.

* * * * *

UNITED STATES PATENT AND TRADEMARK OFFICE
CERTIFICATE OF CORRECTION

PATENT NO.     : 6,501,379 B2
DATED          : December 31, 2002
INVENTOR(S)    : William C. Maloney It is certified that error appears in the above-identified patent and that said Letters Patent is hereby corrected as shown below:

<u>Column 13, line 1 to Column 18, line 38,</u>
Cancel claims 1-54.
Insert the following ten (10) claims in place of claims 1-54:

1. A key tracking and control system comprising:

a trackable object associated with each key to be tracked, each trackable object having a lower portion and an upper portion;

an openable drawer for removably receiving and storing a plurality of said trackable objects and the keys associated therewith;

said drawer having an array of internal sockets each configured to receive the lower portion of a trackable object with the upper portion of the trackable object being visible within said drawer;

UNITED STATES PATENT AND TRADEMARK OFFICE
CERTIFICATE OF CORRECTION

| | |
|---|---|
| PATENT NO. | : 6,501,379 B2 |
| DATED | : December 31, 2002 |
| INVENTOR(S) | : William C. Maloney |

It is certified that error appears in the above-identified patent and that said Letters Patent is hereby corrected as shown below:

Claim 1 continued:

a light emitting diode (LED) in each of said trackable objects, each LED, when lit, emitting light from the upper portion of its trackable object;

an addressable switch disposed in each of said trackable objects and having a ground port, a data port, and at least one input/output (I/O) port;

each addressable switch storing an identification code by which its trackable object can be identified;

at least three conductors on said lower portion of each trackable object, one of said conductors being electrically coupled to said ground port of said addressable switch, another one of said conductors being electrically coupled to said data port of said addressable switch, and a third one of said conductors being electrically coupled through said LED to said I/O port of said addressable switch;

UNITED STATES PATENT AND TRADEMARK OFFICE
CERTIFICATE OF CORRECTION

PATENT NO. : 6,501,379 B2
DATED : December 31, 2002
INVENTOR(S) : William C. Maloney It is certified that error appears in the above-identified patent and that said Letters Patent is hereby corrected as shown below:

Claim 1 continued:

at least three contacts associated with each socket, each contact engaging and making electrical connection with a corresponding conductor on a trackable object when the trackable object is received in said socket;

a controller;

a communications link connecting said controller to selected ones of the contacts of said sockets and thereby coupling said controller to the data ports of addressable switches within trackable objects disposed in said sockets;

said controller being programmed to generate a request and to broadcast said request over said communications link, said request including at least the identification code associated with one of said trackable objects;

each addressable switch setting its I/O port to activate said LED upon receipt from said controller of a request that includes the identification code of said addressable switch, said activated LED visually locating the requested trackable object within said drawer.

UNITED STATES PATENT AND TRADEMARK OFFICE
CERTIFICATE OF CORRECTION

PATENT NO.    : 6,501,379 B2
DATED         : December 31, 2002
INVENTOR(S)   : William C. Maloney It is certified that error appears in the above-identified patent and that said Letters Patent is hereby corrected as shown below:

2. A key tracking and control system as claimed in claim 1 and wherein said addressable switch is mounted on a circuit board in the trackable object.

3. A key tracking and control system as claimed in claim 1 and wherein said LED's in said trackable objects, when lit, project light upwardly away from said array of internal sockets.

4. A key tracking and control system as claimed in claim 1 and wherein said trackable objects comprise containers for containing keys to be tracked.

5. A key tracking and control system as claimed in claim 1 and wherein said third one of said conductors is for providing operating voltage to said LED and wherein said I/O port of each addressable switch is set low to cause said LED to light upon receipt of a request that includes the identification code of said addressable switch.

UNITED STATES PATENT AND TRADEMARK OFFICE
CERTIFICATE OF CORRECTION

PATENT NO. : 6,501,379 B2
DATED : December 31, 2002
INVENTOR(S) : William C. Maloney It is certified that error appears in the above-identified patent and that said Letters Patent is hereby corrected as shown below:

6. A trackable object for use in a key tracking and control system wherein a storage unit has an array of sockets for removably receiving a plurality of said trackable objects, said trackable object comprising:

a housing having a bottom portion and a top portion;

an electronic circuit including an addressable switch, said electronic circuit being insertable into said housing;

a set of conductors electrically coupled to said electronic circuit and being positioned on said trackable object such that said conductors are disposed in a socket of said storage unit when said trackable object is received in the socket;

a light emitting diode (LED) in said trackable object, said LED being electrically coupled to said electronic circuit and being positioned to emit light from said top portion of said housing when lit by said electronic circuit;

UNITED STATES PATENT AND TRADEMARK OFFICE
CERTIFICATE OF CORRECTION

PATENT NO.    : 6,501,379 B2
DATED         : December 31, 2002
INVENTOR(S)   : William C. Maloney It is certified that error appears in the above-identified patent and that said Letters Patent is hereby corrected as shown below:

Claim 6 continued:

said addressable switch having a ground port, a data port, and an I/O port and said set of electrical conductors including a first conductor electrically coupled to said ground port, a second conductor electrically coupled to said data port, and a third conductor electrically coupled through said LED to said I/O port.

7. A trackable object as claimed in claim 6 and further comprising a current limiting component in series with said third conductor, said LED, and said I/O port of the addressable switch.

8. A trackable object as claimed in claim 6 and wherein said current limiting component is a resistor.

UNITED STATES PATENT AND TRADEMARK OFFICE
CERTIFICATE OF CORRECTION

PATENT NO. : 6,501,379 B2
DATED : December 31, 2002
INVENTOR(S) : William C. Maloney It is certified that error appears in the above-identified patent and that said Letters Patent is hereby corrected as shown below:

9. A trackable object as claimed in claim 6 and wherein said addressable switch and said LED are mounted on a printed circuit board insertable in said housing from said bottom portion thereof.

10. A key tracking system comprising:

a plurality of trackable objects, each trackable object having a lower portion and an upper portion;

a storage unit for removably receiving and storing a plurality of said trackable objects;

said storage unit having an array of sockets configured to receive the lower portions of trackable objects with the upper portions of said trackable objects being visible in said storage unit;

an addressable switch in each of said trackable objects, each addressable switch storing an identification code by which its trackable object may be identified and having at least a ground terminal, a data terminal, and an input/output (I/O) terminal;

UNITED STATES PATENT AND TRADEMARK OFFICE
CERTIFICATE OF CORRECTION

PATENT NO.    : 6,501,379 B2
DATED         : December 31, 2002
INVENTOR(S)   : William C. Maloney It is certified that error appears in the above-identified patent and that said Letters Patent is hereby corrected as shown below:

Claim 10, continued:

a light source in each of said trackable objects, each said light source being electrically coupled to said I/O terminal of said addressable switch and being positioned to emit light from the upper portion of its trackable object when lit to indicate visually the location of the trackable object within the storage unit;

a computer-based controller; and a communications link coupling said controller to the data terminals of addressable switches within trackable objects disposed in sockets of said storage unit;

each of said addressable switches being adapted to set its I/O port to light its LED upon receipt from said controller via said communications link of a request that includes the Identification Code stored in the addressable switch.

Signed and Sealed this

Eleventh Day of February, 2003

JAMES E. ROGAN
*Director of the United States Patent and Trademark Office*